US006812954B1

(12) United States Patent
Priestman et al.

(10) Patent No.: US 6,812,954 B1
(45) Date of Patent: Nov. 2, 2004

(54) MOBILE COMMUNICATIONS (75) Inventors: Paul Priestman, London (GB); Oliver King, London (GB); Sean Lewis, London (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

(21) Appl. No.: 09/700,248

(22) PCT Filed: May 4, 1999

(86) PCT No.: PCT/GB99/01383

§ 371 (c)(1),
(2), (4) Date: Nov. 8, 2000

(87) PCT Pub. No.: WO99/59312

PCT Pub. Date: Nov. 18, 1999

(30) Foreign Application Priority Data

May 8, 1998 (GB) ............................................. 9809976

(51) Int. Cl.[7] ................................................. H04N 7/14
(52) U.S. Cl. .................... 348/14.01; 379/93.7; 455/550
(58) Field of Search .......................... 348/14.01, 14.02, 348/14.04, 14.16; 379/93.7, 93.23, 433.03, 433.02, 433.04, 433.13; 455/550, 556, 557, 566, 90, 556.1, 550.1

(56) References Cited

U.S. PATENT DOCUMENTS

| 4,258,387 A | * | 3/1981 | Lemelson ..................... 358/85 |
| 4,400,725 A | * | 8/1983 | Tanigaki ...................... 358/85 |
| 4,450,495 A |   | 5/1984 | Naruki |

(List continued on next page.)

FOREIGN PATENT DOCUMENTS

| DE | 3323858 | 1/1985 |
| DE | 195 28 424 | 11/1996 |
| EP | 0 493 893 | 7/1992 |
| EP | 0 596 558 | 5/1994 |
| EP | 0 776 140 | 5/1997 |
| EP | 0 796 026 | 9/1997 |
| EP | 0 798 650 | 10/1997 |
| EP | 0 898 223 | 2/1999 |
| EP | 0 898 405 | 2/1999 |
| FR | 2 746 997 | 10/1997 |
| GB | 2 295 744 | 6/1996 |
| GB | 2 314 179 | 12/1997 |
| GB | 2 317 531 | 3/1998 |
| GB | 2 322 504 | 8/1998 |
| JP | 07240722 A | 9/1995 |
| JP | 9247250 | 9/1997 |
| JP | 9247734 | 9/1997 |
| JP | 10065780 | 3/1998 |
| JP | 10313452 | 11/1998 |
| JP | 11112860 | 4/1999 |
| JP | 11219249 | 8/1999 |
| WO | WO 97/26744 | 7/1997 |
| WO | WO 97/43852 | 11/1997 |
| WO | WO 99/27433 | 6/1999 |

*Primary Examiner*—Curtis Kuntz
*Assistant Examiner*—Lun-See Lao
(74) *Attorney, Agent, or Firm*—Knobbe Martens Olson & Bear LLP (57) ABSTRACT

A mobile videophone capable of transmitting and receiving information in mobile telecommunications systems, particularly cellular radio networks. The individual components of the videophone are arranged such that the videophone has several different operational configurations to enable a user to select the appropriate configuration for the circumstances in which the videophone is being used. In one embodiment, a videophone can be used as a portable video conferencing device for multiple parties to a call, but should the user wish to hold a private discussion in a public place, the doors can be moved towards the closed position to retain privacy by shielding of the video display. In a further embodiment, a videophone includes two displays mounted on different portions, one of which includes a video camera, which are pivotable from a closed position by approximately 270°.

10 Claims, 5 Drawing Sheets

U.S. PATENT DOCUMENTS

| | | | |
|---|---|---|---|
| 4,525,746 A | | 6/1985 | Mangold et al. |
| 4,928,301 A | * | 5/1990 | Smoot .......................... 379/53 |
| 5,111,498 A | * | 5/1992 | Guichard et al. ............. 379/53 |
| 5,177,784 A | | 1/1993 | Hu et al. |
| 5,282,027 A | * | 1/1994 | Tanigaki ...................... 358/85 |
| 5,406,027 A | | 4/1995 | Matsumoto et al. |
| 5,414,444 A | * | 5/1995 | Britz .......................... 345/156 |
| 5,491,507 A | * | 2/1996 | Umezawa .................... 348/14 |
| 5,550,754 A | | 8/1996 | McNelley et al. |
| 5,675,426 A | * | 10/1997 | Meisner et al. ............. 358/838 |
| 5,748,725 A | * | 5/1998 | Kubo .......................... 379/387 |
| 5,841,849 A | * | 11/1998 | Macor ......................... 379/142 |
| 5,907,615 A | | 5/1999 | Kaschke |
| 5,953,048 A | * | 9/1999 | Mikami et al. ............... 348/14 |
| 5,999,821 A | | 12/1999 | Kaschke |
| 6,069,648 A | * | 5/2000 | Suso et al. .................... 348/14 |
| 6,154,540 A | | 11/2000 | Kaschke |
| 6,157,718 A | | 12/2000 | Kaschke |
| 6,177,950 B1 | * | 1/2001 | Robb .......................... 348/14 |
| 6,346,964 B1 | * | 2/2002 | Rogers et al. ........... 348/14.11 |
| 6,559,825 B2 | * | 5/2003 | Jacobsen et al. ............ 345/102 |
| 2001/0000676 A1 | | 5/2001 | Zhang et al. |

* cited by examiner

MOBILE COMMUNICATIONS

FIELD OF THE INVENTION

The invention relates generally to mobile communications terminals. More specifically but not exclusively, the invention relates to portable videophone capable of receiving and transmitting information in mobile telecommunications systems, such as cellular radio networks. Such devices may be referred to as mobile videophones.

BACKGROUND OF THE INVENTION

The inclusion of a video camera and display in a mobile telephone handset so as to allow mobile video-conferencing has been proposed in various documents.

U.S. Pat. No. 5,414,444 (AT&T) describes a communicator having an openable cover which contains an LCD-type display and a video camera. In this document, the video camera is reorientable when the cover is open, and the communicator includes mechanical apparatus interactive with the closing of the cover to reset the camera to a stardard position after use.

A further form of mobile videophone is proposed in PCT publication number WO97/26744. This documents describes a portable telephone having a display and a camera mounted in the main body of the phone. The camera is mounted on a rotational pivot to enable it to receive images from various directions.

SUMMARY OF THE INVENTION

The present invention aims to provide improvements in the construction and the functionality of mobile terminals.

According to one aspect of the invention there is provided a mobile telecommunications terminal comprising a display, a first audio transducer mounted on a first mounting portion and a second audio transducer mounted on a second mounting portion, wherein said first and second mounting portions are movable from a first relative position in which said terminal is compact and in which said audio transducers are relatively closely spaced to a second relative position in which said display is uncovered and in which said audio transducers are relatively widely spaced said first and second audio transducers being either:

(i) both audio transmitters; or
(ii) both audio receivers.

This aspect provides a construction of mobile communications terminals which allows movement from a first to a second position that both uncovers the display and moves the audio transducers to operative and widely spaced positions. The audio transducers are of the same type and therefore provide effective stereo audio transmission or reception, or mono audio transmission or reception in two locations.

Preferably, the mobile communications terminal is provided with two audio transmitter and two audio receivers, a transmitter and a receiver being mounted on each mounting portion. This provides for both effective stereo audio transmission and effective stereo audio reception. If the mobile terminal is adapted to be held against the head in use, this provides that it may be used in two alternative orientations.

According to a further aspect of the invention there is provided a mobile terminal comprising a display and an image capture device mounted on a body portion of the terminal, and two shielding portions mounted to said body portion on opposed sides of said display, said shielding portions being relatively movable to a plurality of positions in which said display is visible and visible to different degrees when displaying images.

In this arrangement, the shielding portions may provide different degrees of viewing privacy.

Preferably, the shielding portions are movable into a further position in which the display is entirely covered by the shielding portions. In this manner the display may be protected when not in use.

The shielding portions may be mounted on opposed sides of the body portion of the terminal and pivotally movable between the plurality of positions and to a position in which the shielding portions lie over the body portion, which provides for compact and secure portability.

According to a further aspect of the invention there is provided a mobile telecommunications terminal comprising a radio interface for transmitting and receiving radio signals to and from a mobile communications system, said terminal comprising a first portion comprising a display for displaying images received via said mobile communications system and a second portion comprising a camera for picking up images to be transmitted via said mobile communications system, said first and second portions being pivotally interconnected such that said camera may be oriented either in a direction facing a user viewing said display or in a direction facing away from a user viewing said display, by pivotal movement of said second portion relative to said first portion.

In this manner, the user may present the remote party to the call either with a view of themselves or a view of what they can see before them, whilst retaining a view of the remote party on the display.

According to a further aspect of the invention there is provided a videophone comprising a display panel on which an image is formed by selectively activating a matrix or array of electrodes and a video camera located immediately behind said display panel. This provides for compactness of a videophone whilst enabling the user to hold a conversation with the remote party as if speaking in real life.

According to a yet further aspect of the invention there is provided a portable videophone comprising a first display panel for displaying still and/or video images, and a second display panel for displaying still and/or video images, said first and second display panels being movable from a first, compact, relative position, in said display panels are placed in a facing relationship, to a second, fully operative, relative position in which images on both said display panels are simultaneously viewable by a user.

This arrangement provides a compactly portable videophone and a versatile dual display.

BRIEF DESCRIPTION OF THE DRAWINGS

Further aspects and advantages of the invention will be apparent from the following, in which embodiments of the invention will now be described, by way of example only, with reference to the accompanying drawings in which.

DETAILED DESCRIPTION OF CERTAIN INVENTIVE EMBODIMENTS

Figure 1:
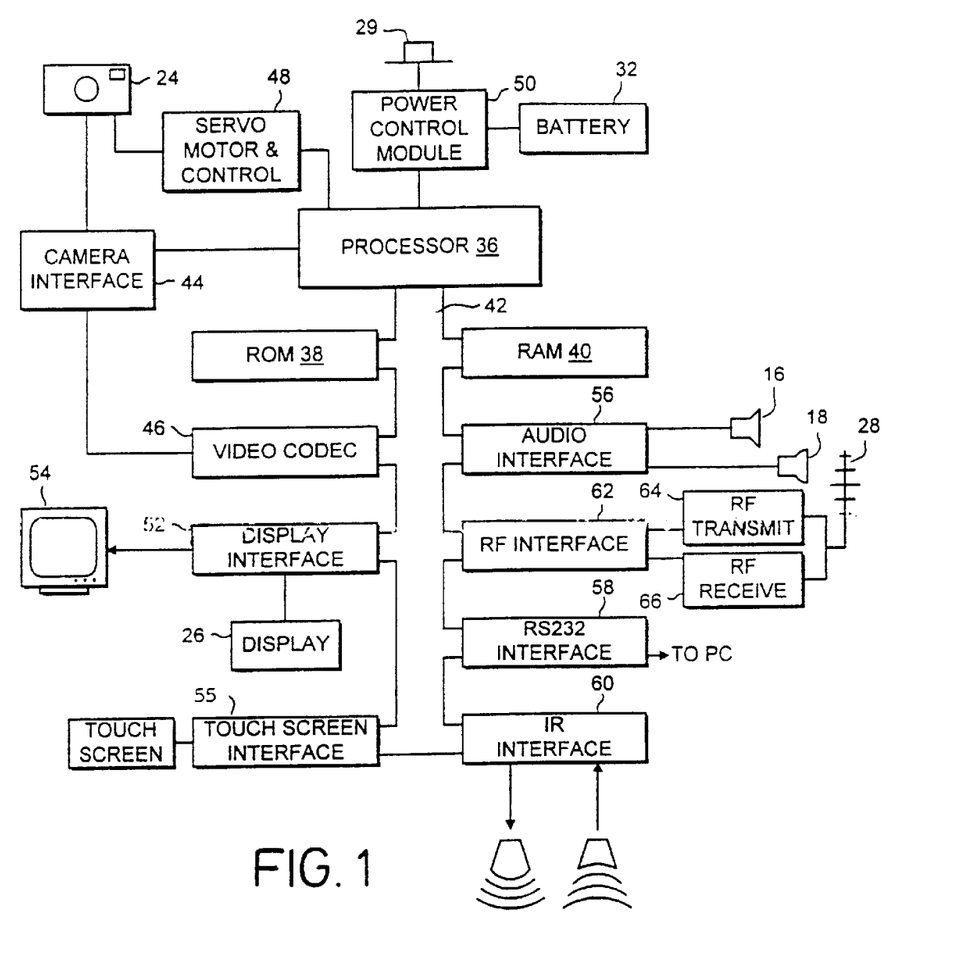
FIG. 1 is a schematic block diagram of the functional elements of a videophone in accordance with the invention.

FIG. 1 shows a schematic block diagram of the main functional elements which may be included commonly to the different embodiments of the invention, which elements are each individually known and will not be described in detail herein. A main processor 36 may be a conventional programmable microprocessor, or a special purpose or specially configured unit (e.g. a digital signal processor) could alternatively be used A read-only memory (ROM) 38 is connected to the processor 36 for the storage of control programs, data and images. The ROM 38 can be implemented by any appropriate technology, for example, by a flash PROM. A random-access memory (RAM) 40 is connected to the processor 36 via a bus 42, is used as a working storage and for the storage of data and images captured using a CCD video camera 24.

Signals relating to the data captured by the camera are passed via a camera interface 44 to the processor 36 to be processed. The camera interface 44 also provides the video code 46 with a digital representation of the captured data from the camera 24, where it can be suitably processed for display and/or transmission to the mobile communications system. An indicator light may be connected to the processor to report successful capture of data and/or images from the camera 24 and may also be used during video conferencing to indicate the correct usage of the device.

The camera interface 44 carries out all the necessary signal conditioning as required on receiving images from the camera 24. Signal conditioning will depend on the exact configuration of the camera but preferably comprises signal conditioning to enable accurate analogue to digital conversion with sufficient buffering of the captured data. The camera 24 will include all the necessary support circuitry to produce a fully functional camera delivering a fully formatted video signal. The camera 24 may also include circuitry to regulate the voltage for power supply control and a suitable output buffer to directly drive a standard VDU should the videophone be connected to an external device.

The camera 24 may be fixed in a predetermined orientation in the central portion 10. Alternatively, the camera 24 may be provided with suitable mechanism to allow adjustment of the orientation of the camera to enable the user to point the camera in alternative directions. The positioning of the camera 24 can be adjusted manually or a servo motor may be provided to alter the positioning. The servo motor is connected to the processor 36 via a controller 48.

The on/off button 29 is connected via a suitable interface to a power control module 50. The power control module 50 responds to the operation of this button in a powered down state to connect the battery 32 to the processor 36. The power control module 50 may also control the charging of the battery 32. The power control module 50 will also control the power requirements when a standard AC/DC power supply is connected to the videophone.

A display interface 52 connects the display 26 via the bus 42 to the processor 36. The display interface 52 responds to instructions from the processor 136 to drive the built-in display 26 in a conventional manner. The display interface 52 may also incorporate the necessary circuitry to drive a standard external video display unit via a suitable connector 54.

The display 26 is provided with a touch-screen. A touch-screen interface 55 couples the touch-sensitive display 26 to the processor 36 via the bus 42. The touch-screen is a device independent of the video display 26, for example, a transparent touch-screen membrane is placed over the display 26 and connected appropriately.

The processor 36 can be arranged to transmit to the display 26 a menu of user selectable items, and to be responsive to a location at which the screen is touched for input of the user selection of an item. The touch-sensitive screen can then thus be used as a dynamic and reconfigurable user interface. Touch-screen entry can be used in place of or in addition to the entry's commands from an external keyboard or voice command if appropriate. Additionally, the touch-screen area can be configured as a general purpose scribing area to allow entry of data and written commands.

An audio interface 56 connects the audio receiver means, consisting of one or more microphones 18 and audio transmitter means such as one or more ear-pieces and/or speakers 16 to the processor 36 and carries out all the necessary signal conditioning as required to output audio signals and to receive audio signals.

The videophone includes infra-red data reception and transmission capabilities and a suitable infra-red interface 60 is provided. The infra-red interface connects an infra-red port to the processor 36 via the bus 42.

A radio-frequency (RF) interface 62 is also connected via the bus 42 to convert any data to be transmitted into signals for driving an RF transmitter 64, and converts signals from an RF receiver 66 into data to be passed via the bus to the relevant interfaces. The RF transmitter 64 and the RF receiver 66 are connected to a radio antenna 28. This RF interface 62 consequently enables wireless communications between the videophone and the mobile communications system.

The processor 36 is programmed by means of control programs and data stored in the ROM 38 and in use, the RAM 40, to receive signals from the camera 24 via camera interface 44, to interpret those signals and to derive data therefrom which are displayed on display 26 and which can be stored in the RAM 40 or any other suitable memory device.

Other interfaces may be included to increase the flexibility of the unit, for example, RS232 interfact 58 may be included, for transmitting and receiving data in RS232 format. The RS232 interface enables the processor 36 to be connected via the bus 42 to allow the connection of other compatible devices to the videophone through a standard RS232 cable Depending on the refresh rate used and the number of pixels used in the images, video image data transmitted and received by the videophone may require compression for transfer via a low data rate radio channel, such as those currently available in known cellular radio networks. The video data may be compressed using the MPEG4 standard. Alternatively, the video images captured may be compressed into a different format suitable for transmitting the data derived across the mobile communications system, such as that disclosed in International Patent Publication WO95/20296.

Figure 2A:
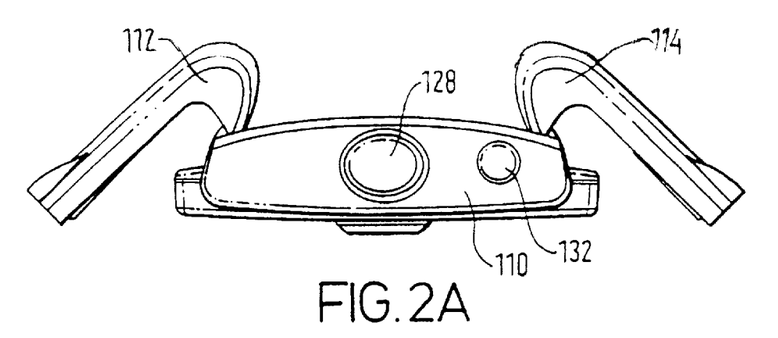
FIG. 2A is a plan view of one embodiment of videophone in accordance with the invention.
Figure 2B:
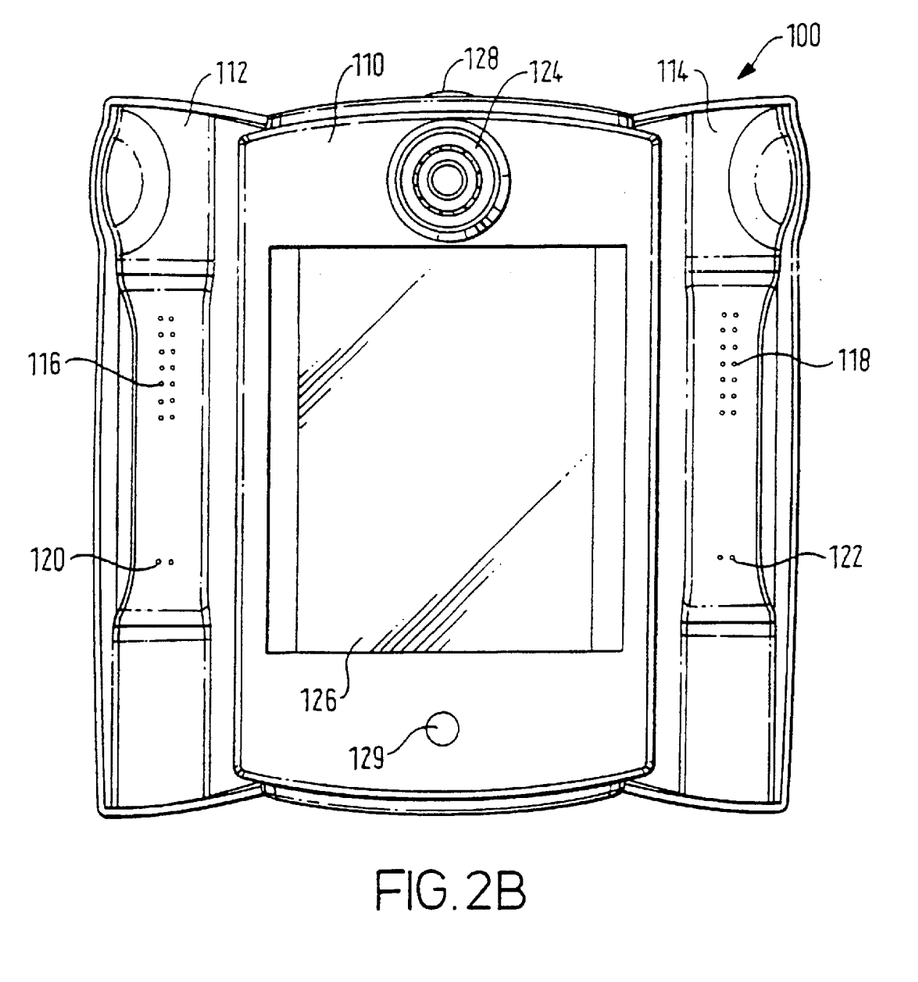
FIG. 2B is a schematic front view of the videophone of FIG. 2A.

FIGS. 2A and 2B are schematic views from above and from the front of a first embodiment of the portable videophone. The videophone 100 is capable of transmitting and receiving audio and visual data in a mobile communications system. The videophone 100 comprises a central portion 110 and two doors 112, 114. The doors 112, 114 are hingeably attached to the central portion 110 by hinging means, for example a dowel arrangement. The doors 112, 114 in FIGS. 2A and 2B are shown in their open position. Each door 112. 114 includes a speaker 116, 118 and a microphone 120, 122, to provide stereo sound reception and transmission when open. The central portion 110 includes a video camera 124.

On the front surface of videophone 100 as shown in FIG. 2B, a display screen 126 is provided to convey video images or functional information to the user. The display screen preferably comprises a suitable two-dimensional color liquid crystal display which may be back-lit. Furthermore, the display screen in this embodiment is preferably a touch-screen which allows the user to input commands and raw data using a removable stylus 134. The touch-screen is used to control the basic operation of the videophone 100 as well as being able to display video images received. It will be appreciated that any other form of display capable of displaying functional information or video images may be used.

An antenna 128 is located in the body of the videophone 100. The antenna 128 is connected to associated radio transmitter and receiver components also contained within the videophone.

Figure 3A:
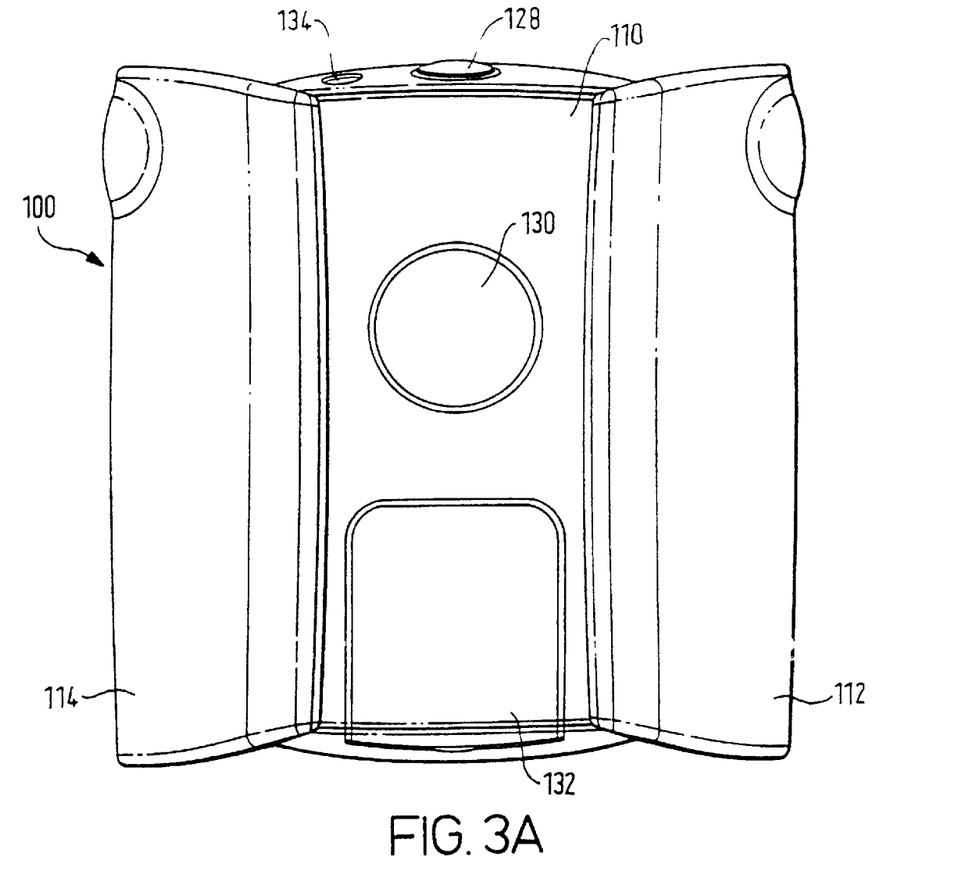
FIG. 3A is a schematic rear view of the videophone of FIGS. 2 A&B.
Figure 3B:
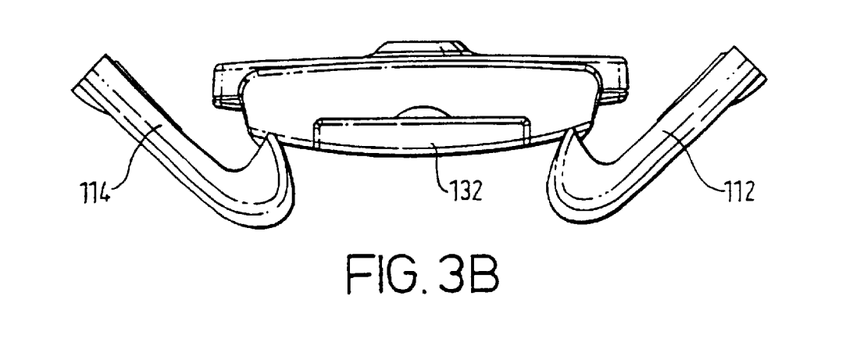
FIG. 3B is a schematic underneath view of the videophone of FIG. 3A.

The videophone is powered using a DC banery 132, located in the rear of the central portion 110 of the videophone 100 as shown in FIGS. 3A and 3B. The battery 132 can be recharged from a standard AC/DC power supply (not shown). In the embodiment shown, the battery is additionally removable and may be charged in an appropriate charging receptacle. However, a jack-plug and socket arrangement may be provided to enable the battery to be charged in situ on the videophone 100.

The videophone 100 has an infra-red communications part 129 to provide proximate wireless transfer of data with compatible devices.

A removable ear-piece 130 is located in the rear of the central portion 110 as shown in FIG. 3A. The removable ear-piece 130 in the example shown is connected to the central portion 110 by a wire connection (not shown). Removal of the ear-piece from the body of the videophone automatically disables the speakers 116, 118 and activates the ear-piece, to allow a user privacy of hearing if desired.

The infra-red port 129 may also be used to transfer signals between the videophone 100 and the removable ear-piece 130, which then need not be connected to the central portion 110 by means of a wire connection.

The camera 124 may also be removable and connected to the videophone 100 by the infra-red communications port 129.

The videophone 100 may also be provided with suitable connection means for connection of the videophone to an external video display unit, external speakers, external microphones or an external video camera if required.

The doors 112, 114 when in the open position as shown in FIG. 2B advantageously provide the videophone 100 with support in various orientations if, for example, a user wished to stand the unit on a horizontal surface. The doors 112, 114 are movable from the open position as shown in FIG. 2B to a closed position (not shown) in which the two doors abut and cover the entire front of the videophone 100 thereby protecting the display 126 and camera 124. In one embodiment the doors are independently movable and it is possible to shut door 112 whilst leaving door 114 in the open position. Attentively, the doors 112, 114 may be linked together by a linking device to ensure that the doors move together and to the same extent. Such a mechanism may be a rack and pinion linking device enclosed within the casing of the videophone 100. The doors 112, 114 may be used to shield the video display and the camera laterally whilst the videophone is in use.

Should the user not wish to be overlooked or overheard, movement of the doors to an intermediate position between the fully open and closed positions will provide the user with increased privacy.

The hinges attaching the doors 112, 114 to the central portion 110 may have a predetermined number of settings, for example, a fully open setting, an intermediate setting and a closed setting. The predetermined settings may be defined by a cam mechanism in each of the hinges.

Alternatively, the movement of the doors may be continuous from the fully open position to the fully closed position.

The inside of the doors 112, 114 in the embodiment described are made of a lighter colored material to improve the lighting conditions by reflecting ambient light into the face of the user to improve the video image captured by the video camera 124.

In use, the user will open the doors 112. 114 of the videophone 100, and position it at an appropriate height to capture the required image. Using the removable stylus and the touch-screen, the user will input the requested number and initiate the call. When connected, the user may choose to use the integral speakers and microphone, or alternatively may use the removable ear-piece 130 if the user does not wish the telephone conversation to be broadcast through the speakers 116, 118 Furthermore, although the videophone 100 provides the ability for the user to transmit the video images stored and captured by the camera 124 should the user not wish to take advantage of this, the video camera 124 can be disabled. With the doors 112, 114 in the fully open position the videophone will stand on a suitable surface and the user can conduct the telephone conference in an open manner. The display will display any video image received from the other party to the call if that party is also using a videophone. The microphones 120, 122 will pick up stereo sound from the area immediately adjacent the videophone 100. In this open manner it is envisaged that the videophone may be used as a video conferencing device where several users may communicate with the other party to the conversation at the same time.

If the videophone 100 is being used in a more public environment, the user may partially close in the doors 112, 114 to shield the display 126 from public view and/or to allow the other party to the call to view only a relatively narrow field of view from the video camera 124.

Thus, the videophone 100 may be used as a portable handheld multi-user video conferencing terminal or in the alternative for an individual user to conduct more private video conversations, even when in public, as required.

It will be appreciated that different stand mechanisms to that disclosed above can be employed. The battery 132 may pivot out from the central portion 110 of the videophone 100 to create a rear stand for the videophone.

It will be appreciated that the videophone may only comprise one microphone and one speaker. Furthermore, the microphone and or speaker need not be mounted on the door portions, but may be mounted on the central portion 110.

Additionally, the camera 124 need not be mounted above the display 126 but may be mounted in any position capable of receiving an image of the user.

FIGS. 4 to 7 illustrate a second embodiment of the invention. In this embodiment, a mobile videophone 200 consists of an upper half 202 and a lower half 204 connected via a hinge mechanism 206. The functional elements illustrated in FIG. 1, other than the IR interface (which may, however, be provided) are contained within and distributed between the upper half 202 and the lower half 204 of the device.

Figure 4:
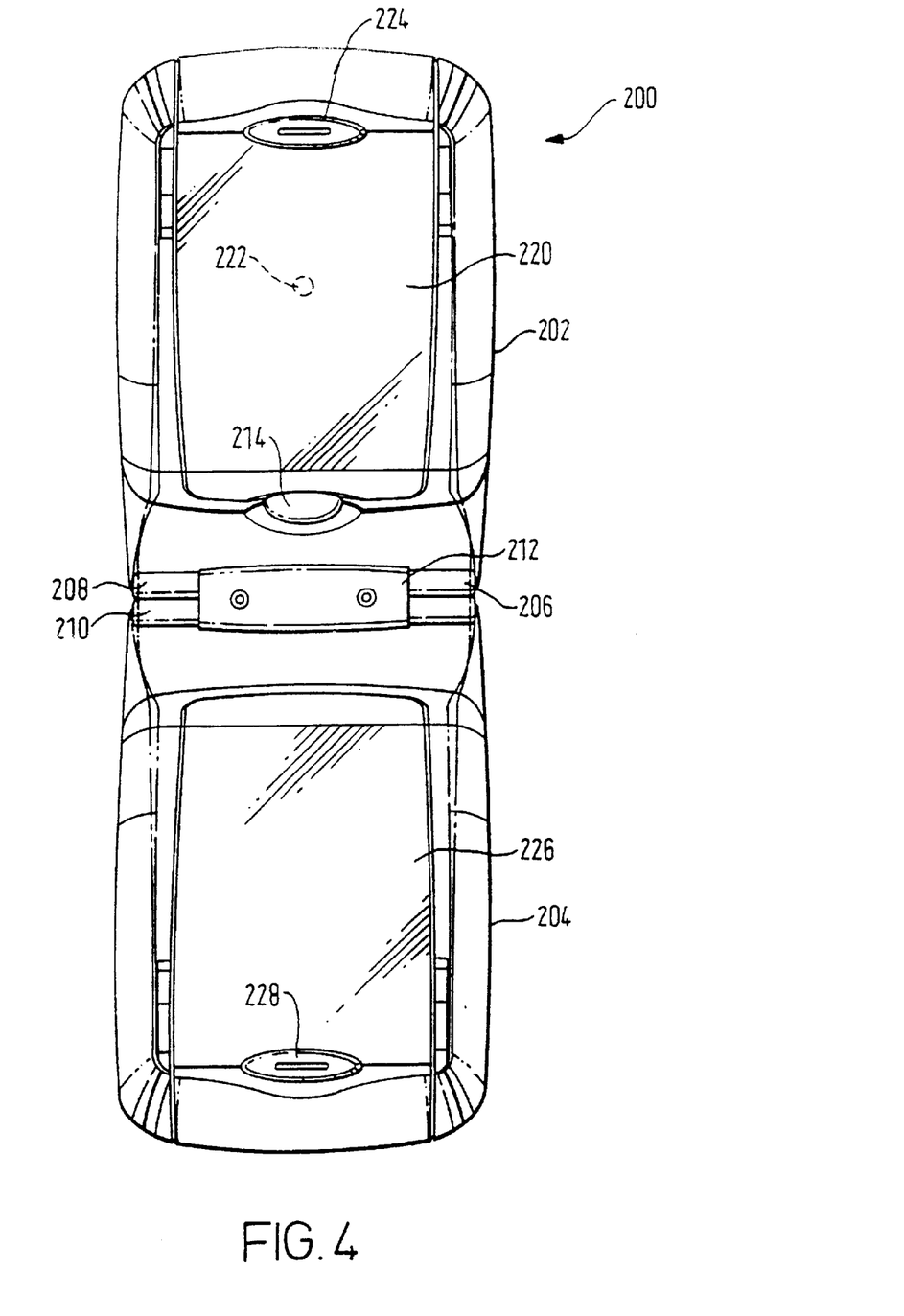
FIG. 4 is a plan view of a further embodiment of videophone in an open position, in accordance with the invention.

The hinge mechanism 206 includes abutting surfaces 208, 210 on each of the upper and lower halves 202, 204, which include an outer covering of rubberised material and display a circular sector in cross section where the two abutting surfaces contact through a range of relative positions of the first half 202 with respect to the second half 204. The abutting surfaces 208, 210 are rubberised in order to provide non-slipping frictional contact between the two surfaces 208, 210. In an alternative arrangement, the abutting surfaces may be clogged to prevent mutual slippage.

A hinge clip 212 connects the upper half 202 and lower half 204, and maintains the abutting surfaces 208, 210 in contact throughout the range of relative positions of the upper and lower halves 202, 204. Flexible electrical contacts between the functional elements illustrated in FIG. 1 contained within the upper and lower halves 202, 204 are routed through the hinge clip 212.

Figures 5, 6:
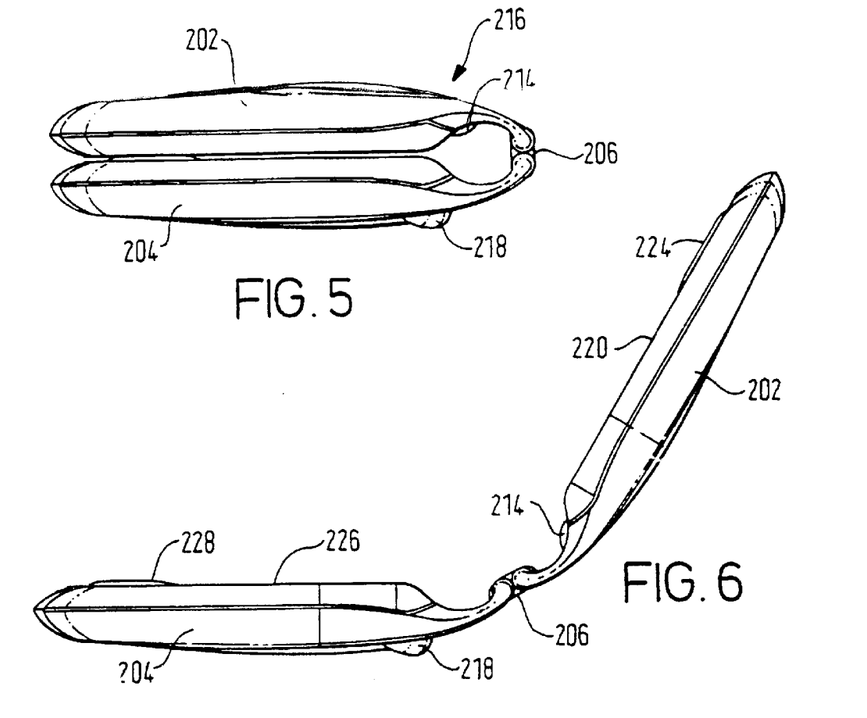
FIG. 5 is a side view of the videophone of FIG. 4, in a fully closed position.
FIG. 6 is a side view of the videophone of FIG. 4, in an open position.

The upper and lower halves 202, 204 are substantially identical in outer shape, save for two features. A call status button 214 is provided on the upper half 202. The call status button 214 is exposed on the inner surface of the upper half 202, as shown in FIG. 4, and is also exposed on the outer surface of the upper half 202, in location 216 illustrated in FIG. 5. Therefore, the call status button 214 is visible both when the videophone 200 is in a closed state, as illustrated in FIG. 5 on the outer surface of the videophone 200, and when the videophone is in the open state, as illustrated in FIG. 4, when viewed from the inner surface of the upper half 202.

The call status button 214 contains three differently colored light emitting diodes, and is translucent. The light emitting diodes consist of a green light emitting diode, a red light emitting diode and a blue light emitting diode, such that selective actuation of the light emitting diodes in different combinations provides a range of colors on the call status button 214 whereby the call status may be ascertained. For example, the green light emitting diode may be actuated lone in crder to indicate an incoming call. The red light emitting diode may be actuated alone in order to indicate the end of a call. Other call status states may be indicated by actuation of the light emitting diodes in different combinations.

The call status button 214 is also operable either from the inside surface of the upper half 202 or from the outside surface of the upper half 202. That is to say, the button may be pressed in order to alter the call status either when the videophone 200 is in an opened state or in a closed state. Pressing of the button may for example act to place the videophone in an off-hook call status when an incoming call is signaled by actuation of the green light emitting diode.

The lower half 204 is provided with support projections 218, located on either side of the lower half 204 at the rear of the lower half 204, in order to provide stability wen the videophone is placed on a horizontal surface. The lower half 204 of a videophone therefore adopts a predetermined disposition when placed on a horizontal surface.

The upper half 202 is provided with a liquid crystal display 220 for displaying video image received via a radio interface of the mobile communications system. The liquid crystal display panel 220 may consist of any suitable known LCD-type display, these being of the type whereby voltages are selectively applied across pixels of the display, via transparent electrodes running through the plane of the display, in order to display a desired image. The display 220 may be either a color display or a black and white display.

A CCD video camera 222 is located substantially in the centered of the display panel 220, immediately behind it within the body of the upper half 202. At least when the video camera 222 is actuated, at least a portion of the display panel 220 located immediately in front of the video camera 222 is maintained in a transparent state.

The video display 220 may be actuated to display an image simultaneously with operation of the video camera 222. During such simultaneous operation of the video camera and the display 220, for example during a video conference, a small area of the display 220, being the area situated immediately in front of the video camera 222, is maintained in a transparent state by selectively addressing pixels of the LCD display located in that small area so as to maintain the small area in a constantly transparent state during image reception at the video camera 222. Thus, the image displayed on video display 220 is a conventional video image, with a small part, located in the small area described, in which no image information is displayed.

Alternatively, the image may be displayed with lesser intensity in the small area described than in the remainder of the display panle 220, so as to improve the quality of the image displayed to the user whilst allowing the video camera to receive sufficiently constant levels of light via the small area of the display panel 220 to provide a desired quality of image pick up.

The upper half 202 also comprises an audio portion 224, behind which a microphone and a loudspeaker are located.

The lower half 204 comprises an LCD video display 226 essentially identical to the video display 220 described as contained in the upper half 202, save that no video camera is provided in the lower half 204, and therefore that a full image may be displayed over the entire display 226.

The lower half 204 also contains an audio portion 228, which, similar to audio portion 224, has an audio loudspeaker and an audio microphone located behind it.

FIG. 4 is a plan view of the videophone 200 corresponding with the side view illustrated in FIG. 6. In the positioning illustrated in these views, the videophone 200 may be used in various alternative modes of use.

In a first mode of use, the lower half 204 of the videophone is placed on a horizontal surface, or is hand held, such that the upper half 202 is oriented vertically and such that the display panel 220 faces the user. In this mode, an image of the user may be picked up on the video camera 222 and transmitted via the radio interface of the mobile communications system, and a video image of a remote party received via the radio interface of the mobile communications system may be displayed on the display panel 220. In addition, the view of the user picked up by the video camera 222 may be displayed on the lower display panel 226, in order to provide a means whereby the user may monitor the image picked up by the video camera 222 during and prior to video image transmission during a call.

The upper and/or lower display panels 220 and 226 are provided with a touch-sensitive membrane. Either the upper display panel 220 and/or the lower display panel 226 may also therefore be used as a man machine interface, combined with iconic and/or alphanumeric displays of videophone functions displayed on the respective panel, in order to allow control of the videophone functions before and during a call transmitted via the videophone.

During a video conference, audio signals consisting of the voice of the user may be picked up on either, or both of, the microphones contained in the audio portions 224, 228. Audio signals, consisting of the voice of the remote party, received via the radio interface of the mobile communications system, may be output via the loudspeakers contained in either or each of the audio portions 224, 228.

In a second mode of operation the videophone 200 is used as a conventional mobile telephone handset, namely the videophone 200, when oriented in a state similar to that illustrated in FIG. 6, is held against the head of the user such that one of the audio portions 224. 228 rests adjacent the ear of the user and the other of the audio portions 224, 228 rests adjacent the mouth of the user. Since a microphone and a loudspeaker are provided in each of the audio portions 224, the videophone 200 may be oriented in two alternative positions during usage in this mode. That is to say, either the audio portion 224 may be held against the ear of the user, with the audio portion 228 held adjacent the mouth of the user, or the audio portion 228 may be held against the ear of the user, with the audio portion 224 held adjacent the mouth of the user. The videophone 200 is preferably arranged to actuate only a single combination of microphone and loudspeaker in the audio portions 224, 228, as required when operating in this mode.

In a further mode of use, the videophone 200 may be oriented in a direction normal to that described above, namely with the videophone extending horizontally when opened out, with the upper half 202 located on the right, and the lower half 204 located on the left, with respect to the user. In this mode, one or more images may be shown on the display panels 220, 226 simultaneously. Furthermore, the microphones and/or loudspeakers provided in each of the audio portions 228 and 224 provide either stereophonic audio output or stereophonic audio reception, or both.

The mode of usage, namely any of the videophone modes described above or the conventional mobile telephone handset mode described above, may be selected by the user via the man machine interface, i.e. by touch-screen selection in a control portion of the display panels 220, 226.

In one embodiment, the videophone is provided with Internet browsing capabilities. Namely, by providing the videophone 200 with an Internet browser application, and appropriate data communications capabilities via the radio interface of the mobile communications system, the mobile videophone 200 may provide Internet access. For example, a WorldWide Web page may be retrieved and displayed one or more of the display panels 220, 226. Hyperlinks may be selected by appropriate interaction with the touch-screen man machine interface. With a suitable radio interface, both HTML pages and video data may be received and displayed simultaneously on different of the display panels 220, 226.

Figure 7:
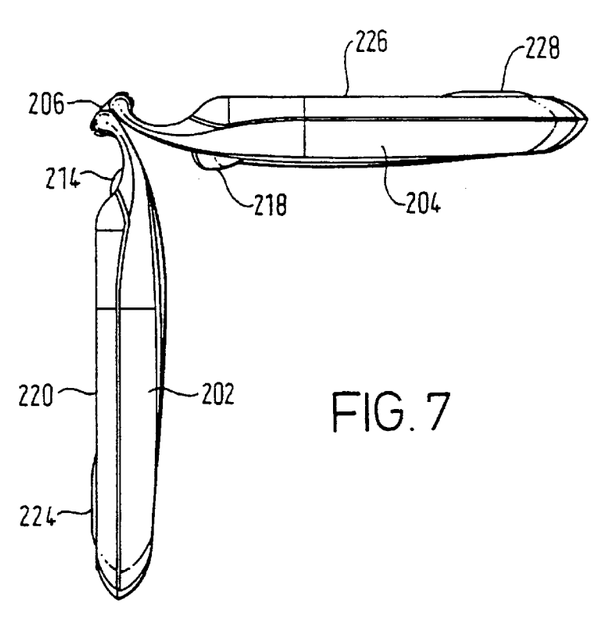
FIG. 7 is a side view of the videophone of FIG. 4, in a fully open position.

A further feature of the videophone 200 relates to functionality enabled by the hinge mechanism 206. Namely, the hinge 206 allows pivoting of the upper half 202 relative to the lower half 204 from the closed position in which both halves are located in parallel planes, as illustrated in FIG. 5 continuously through intermediate positions, in which the upper half is stably oriented with respect to the lower half (so that the halves maintain their relative positions even when free-standing), such as that shown in FIG. 6, continuously through to a fully open position as illustrated in FIG. 7. The lower half 204 is therefore stably positionable at any of a large number of positions between the closedposition of FIG. 5 and the fully open position of FIG. 7.

As will be appreciated, with the videophone 200 handheld and arranged as illustrated in FIG. 7, the user may direct the video camera 222 in a direction facing directly away from the user, quite comfortably, such that the image transmitted by the videophone 200 over the radio interface of the mobile communications network consists not of an image of the user, but of an image of objects located directly in front of the use. In this manner the user may readily illustrate to a remote party what he himself can view. Thus, during a single video conference, the user may orient the upper half 202 relative to the lower half 204 in a plurality of different positions, whilst continuously holding the lower half 204 in one hand and to face the user, thereby allowing the remote party to view various different objects whilst the user himself may continue to view the image displayed on the lower display panel 226. As discussed above, this image may consist of the image picked up by the video camera 222. Alternatively, or additionally, this image may consist of the image of the remote party communicated over the radio interface of the mobile communications system.

Thus, it will be appreciated that the videophone 200 provides a wide variety of modes of usage, and modes of video display and display of control graphics in a man machine interface, which remains convenient to the user. The user may select any of the modes of usage, via the man machine interface, as per a personal preference, or in accordance with the type of images to be displaced on the videophone 200. In addition to the video conferencing mode of usage described above, and the Internet browsing display described above, the display panels 220, 226 may also be used to display still images received via the radio interface of the mobile communications network. Correspondingly, the video camera 222 may be used to pick up still images for transmission via the radio interface of the mobile communications system.

The videophone 200 may also be used to receive television programs, in which case the videophone 200 is preferably oriented in the horizontal position described above, to provide stereophonic audio sound with the television programmed displayed on either, or each of, the display panels 220 226.

By providing the capability of orienting the upper half 202 with respect to the lower half 204 at a whole variety of operational positions, including the position illustrated in FIGS. 4 and 6 and positions in which the upper half 202 is positioned more closely to the lower half 204, the user may select a degree of privacy of viewing as desired. Thus, the videophone 200 may be used as a portable multi-user video conferencing terminal or in the alternative for an individual user to conduct more private video conversations, even when in public, as required.

It will be appreciated that it is not necessary for there to be two speakers and two microphones, and that the microphone and speaker need not be positioned at different audio portions of the device for use as a videophone.

The camera 222 need not be mounted centrally of the display panel 220. Indeed, although it is preferred, the camera need not be mounted immediately behind the display panel 220, but may be located adjacent it on the housing of the upper half 202. Alternatively, the camera may be mounted in the lower half 204. In all of the altermatives described, the video camera should readily orientable to capture a view of the user.

Finally, the invention is not limited in application to videophones. Aspects of the invention may be implemented in other types of mobile terminal, such as mobile telephone handsets, cordless telephone handsets, portable television receivers, etc.

It is to be understood that the embodiments described above are preferred embodiments only. Namely, various features may be omitted, modified or substituted by equivalents without departing from the scope of the present invention, which is defined in the accompanying claims.

What is claimed is:

1. A portable handheld videophone capable of transmitting and receiving audio and visual data in a mobile communications system, the videophone comprising:

two pivotally connected portions;

a microphone for collecting audio data;

a speaker for outputting audio information;

a video camera mounted on one of said two portions; and a video display mounted to the other of said two portions, wherein the two portions are connected so as to be locatable in a first position in which said portions are located adjacent one another in a facing relationship and relatively pivotable, from said first position, by more than 180°.

2. The videophone of claim 1, wherein the two portions are connected so as to be relatively pivotable, from said first position, by approximately 270°.

3. The videophone of claim 1, further comprising a further display mounted to the same portion as said camera.

4. A mobile videophone, comprising:

a radio interface for transmitting and receiving radio signals to and from a mobile communications system;

a first portion having a front surface having a display for displaying images, and a second portion having a camera for picking up images to be transmitted via said mobile communications system, wherein said first and second portions are pivotally interconnected such that said camera may be oriented in a plurality of positions, comprising:

(i) a first position in which said camera is oriented in a direction facing said front surface, the videophone being in a compact state;

(ii) a second position in which said camera is oriented in substantially the same direction as said display, allowing said camera to pick up images of a user; and (iii) a third position in which said camera is oriented more than 1800 away from the first position, allowing said camera to pick up images of objects being viewed by the user while the user may also view said display.

5. The mobile videophone of claim 4, wherein in said third position said camera is oriented substantially 270° away from the first position.

6. A portable videophone, comprising:

a first portion comprising a first display panel for displaying video images; and a second portion comprising a second display panel for displaying video images, wherein said first and second portions are movable from a first, compact, relative position, in which said display panels are placed in a facing relationship, to a second, fully operative, relative position in which images on both said display panels are simultaneously viewable by a user, and wherein said videophone comprises a camera for picking up images of the user, and a radio telecommunications interface for receiving images of a remote party, and wherein said videophone is arranged to display images received via said telecommunications interface on said first panel and to display images received via said camera on said second panel.

7. The portable videophone of claim 6, wherein said first and second display panels are substantially identical.

8. The portable videophone of claim 6, wherein said camera is on said first portion.

9. The portable videophone of claim 6, further comprising an audio transmitter located adjacent said first display panel and an audio receiver located adjacent said second display panel, such that the videophone may be used as a conventional handset mobile telephone.

10. The mobile videophone of claim 6, further comprising support means adapted to allow said terminal to be placed on a horizontal surface in front of a user and arranged such that said display is oriented generally vertically so as to face the user when so placed.

* * * * *

UNITED STATES PATENT AND TRADEMARK OFFICE
CERTIFICATE OF CORRECTION

PATENT NO. : 6,812,954 B1
DATED : November 2, 2004
INVENTOR(S) : Priestman et al.

It is certified that error appears in the above-identified patent and that said Letters Patent is hereby corrected as shown below:

Column 12,
Line 5, please delete "1800" and insert -- 180º --.

Signed and Sealed this

Twentieth Day of December, 2005

JON W. DUDAS
*Director of the United States Patent and Trademark Office*